United States Patent [19]

Nihei et al.

[11] Patent Number: 5,424,867

[45] Date of Patent: Jun. 13, 1995

[54] FABRICATION OF FERROELECTRIC DOMAIN REVERSALS

[75] Inventors: Yasukazi Nihei; Akinori Harada; Yoji Okazaki, all of Kanagawa, Japan

[73] Assignee: Fuji Photo Film Co., Ltd., Kanagawa, Japan

[21] Appl. No.: 198,268

[22] Filed: Feb. 18, 1994

[30] Foreign Application Priority Data

Feb. 18, 1993 [JP] Japan .................. 5-029207

[51] Int. Cl.[6] ................................. G02F 1/35
[52] U.S. Cl. ........................... 359/326; 359/332; 385/122
[58] Field of Search .................. 359/326–332; 385/122; 372/21, 22

[56] References Cited

U.S. PATENT DOCUMENTS

| | | | |
|---|---|---|---|
| 4,861,129 | 8/1989 | Che et al. | 385/122 |
| 5,058,970 | 10/1991 | Schildkraut et al. | 359/328 |
| 5,253,259 | 10/1993 | Yamamoto et al. | 372/22 |

OTHER PUBLICATIONS

J. A. Armstrong, et al., "Interactions between Light Waves in a Nonlinear Dielectric," Physical Review, vol. 127, No. 6, Sep. 15, 1962, pp. 1918–1939.

*Primary Examiner*—John D. Lee
*Attorney, Agent, or Firm*—Sughrue, Mion, Zinn, Macpeak & Seas

[57] ABSTRACT

A method for fabricating an optical wavelength converter element which has a high optical damage threshold value, and is capable of achieving a high wavelength conversion efficiency without involving propagation losses caused by the reflection and scattering of a fundamental wave and a wavelength-converted wave. Domain reversals periodically arranged are formed on a substrate made of a $LiNbO_3$ crystal which acts as a ferroelectric substance possessing a nonlinear optical effect. Thereafter, an ITO thin film made of a transparent electrically conductive material is deposited on a surface of the substrate extending in the direction of the arrangement of the domain reversals, that is, "y" and "z" surfaces.

6 Claims, 4 Drawing Sheets

FABRICATION OF FERROELECTRIC DOMAIN REVERSALS

BACKGROUND OF THE INVENTION

1. Field of the Invention

This invention relates to an optical wavelength converter element for converting a fundamental wave into a second harmonic wave and, more particularly, an optical wavelength converter element in which periodic domain reversals are defined on a ferroelectric crystal possessing a nonlinear optical effect, and a fabricating method thereof.

2. Description of the Prior Art

A proposal has already been made by Bleombergen et al. in Physics Review vol. 127, No. 6 in 1918 (1962), in which the wavelength of a fundamental wave is converted into a second harmonic wave using an optical wavelength converter element with regions (domains) where the spontaneous polarization of a ferroelectric substance possessing a nonlinear optical effect is periodically inverted.

In this method, the fundamental wave call be phase matched with the second harmonic wave by setting the period of $\Lambda$ the domain reversals to be an integral multiple of a coherence length $\Lambda c$ which is given by $$\Lambda c = 2\pi / \{\beta(2\omega) - 2\beta(\omega)\} \quad (1)$$

where $\Lambda\beta(2\omega)$ designates the propagation constant of the second harmonic wave, and $2\beta(\omega)$ represents the propagation constant of the fundamental wave. When wavelength conversions are effected using a bulk crystal made of a nonlinear optical material, a wavelength to be phase-matched is limited to a specific wavelength inherent to the crystal. However, in accordance with the above described method, phase matching can be efficiently carried out by selecting a period $\Lambda$ which satisfies the condition (1) for an arbitrary wavelength.

In the foregoing optical wavelength converting element made of the ferroelectric substance, it has been heretofore known that a ferroelectric,crystal suffers from optical damage caused by a resulting wave, whose wavelength is converted, such as a second harmonic wave. For instance, in the case of an optical wavelength converting element in which a crystal of LiNbO₃(LN) is used as a ferroelectric substance, and periodic domain reversals are formed on that crystal, the crystal may be optically damaged by a second harmonic wave having an output of 2 mW (a wavelength of 477 nm). It cannot be said that the optical wavelength converter element which is susceptible to optical damages by a wavelength-converted wave having such a low output is so practically valuable.

For this reason, in order to improve an optical damage threshold value, it is put forward that metal is deposited on the surface of a ferroelectric substance in such a manner as to extend along the direction of the arrangement of domain reversals so that the deviation of electric charges can be eliminated by this metal having a high electric conductivity.

However, in an optical waveguide type optical wavelength converter element, when the above-mentioned metal is deposited on the surface of a ferroelectric crystal which constitutes an optical waveguide, a leakage part of a fundamental wave which travels and a wavelength-converted wave is affected by reflection and scattering, or the like, caused by this metal, leading to light propagation losses. There arises a problem that these light propagation loses bring about a drop in the efficiency of wavelength conversion. Also, in a bulk crystal type optical wavelength converter element, particularly when the element is made of a thin ferroelectric crystal substrate, the end of a beam such as a fundamental wave and a wavelength-converted wave which passes through the substrate similarly undergoes influences such as reflection and scattering caused by metal on the surface of the crystal, thereby leading to a drop in the efficiency of wavelength conversion.

SUMMARY OF THE INVENTION

In view of the foregoing observations and descriptions, an object of this invention is to provide an optical wavelength converter element which has a high optical damage threshold value, and is capable of obtaining a high efficiency of wavelength conversion without entailing propagation losses caused by the reflection or scattering of a fundamental wave and a wavelength-converted wave.

Another object of this invention is to provide a method for fabricating such an optical wavelength converter element.

To these ends, according to a first aspect of this invention, the present invention provides an optical wavelength converter element in which domain reversals are periodically arranged on a ferroelectric crystal possessing a nonlinear optical effect, and the wavelength of a fundamental wave entered in the direction of arrangement of the domain reversals is converted, the improvement comprising:

a coating made of a transparent electrically conductive material, and formed at least in the vicinity of an optical path for the fundamental wave on a surface that extends in the direction of the arrangement of the domain reversals.

According to a second aspect of this invention, the present invention provides an optical wavelength converter element in which domain reversals are periodically arranged on a ferroelectric crystal possessing a nonlinear optical effect, and the wavelength of a fundamental wave entered in the direction of arrangement of the domain reversals is converted, the improvement comprising:

a low-resistance area (that is, an area whose electrical resistance is reduced lower than other areas) formed from at least the vicinity of an optical path for a fundamental wave toward the inside of the crystal on a surface of the crystal that extends in the direction of the arrangement of the domain reversals made of the ferroelectric crystal.

According to a third aspect of this invention, the present invention provides a method for fabricating the optical wavelength converter element as previously mentioned in the first aspect, the method comprising the steps of:

forming domain reversals periodically arranged on a ferroelectric crystal possessing a nonlinear optical effect; and covering at least the vicinity of an optical path for a fundamental wave on a surface extending in the direction of arrangement of the domain reversals made of the ferroelectric crystal with a coating made of a transparent electrically conductive material.

According to a fourth aspect of this invention, the present invention provides a method for fabricating the optical wavelength converter element as previously mentioned in the second aspect, the method comprising the steps of:

forming domain reversals periodically arranged on a ferroelectric crystal possessing a nonlinear optical effect; and subjecting the crystal to a treatment causing a drop in electrical resistance of, at least, a region ranging from the vicinity of an optical path for a fundamental wave to the inside of the crystal in a surface of the crystal that extends in the direction of arrangement of the domain reversals made of the ferroelectric crystal.

According to a fifth aspect of this invention, the present invention provides a method for fabricating an optical wavelength converter element in which domain reversals are formed especially by the irradiation of electron beams, the method comprising the steps of:

grinding a surface of a ferroelectric crystal which is exposed to electron beams; and carrying out the fabrication method according to the third or the fourth aspect of this invention.

In the optical wavelength converter element according to the first aspect, when at least the vicinity of the optical path for the fundamental wave of the surface that extends to the direction of the arrangement of the domain reversals made of the ferroelectric crystal is covered with the transparent electrically conductive material, the deviation of electrical charges within the ferroelectric crystal, similarly to when metal is deposited on the surface of the crystal, is eliminated by this coating, whereby it becomes possible to improve an optical damage threshold value.

Since the coating is made of a transparent material, this coating, differing from the case when metal is deposited on the surface of the crystal, can prevent the fundamental wave or the wavelength-converted wave from being affected by significant amounts of reflection or scattering, and hence it is possible to achieve a higher efficiency of wavelength conversion.

In the optical wavelength converter element according to the second aspect, when the low-resistance regions are formed on the surface, extending in the direction of the arrangement of the domain reversals made of the ferroelectric crystal, at the area ranging from at least the vicinity of the optical path for the fundamental wave to the inside of the surface, this low-resistance region, similarly to the deposition of metal on the surface of the crystal, acts as a conductive region, whereby the deviation of electric charges of the ferroelectric crystal is eliminated, and an optical damage threshold value can be improved.

This arrangement is constituted not by adding another element such as metal to the crystal but by reducing the resistance of one area of the ferroelectric crystal, and hence the fundamental wave and the wavelength-converted wave are prevented from being affected by reflection or scattering due to such an element. Thereby, it becomes possible to achieve a higher efficiency of wavelength conversion.

Moreover, particularly when domain reversals are produced by the irradiation of electron beams, a noticeably higher efficiency of wavelength conversion can be achieved by carrying out the method according to the third or fourth aspect of this invention after the surface layer portion of the surface to be exposed to electron beams has been ground.

DESCRIPTION OF THE PREFERRED EMBODIMENTS

Figure 1A:
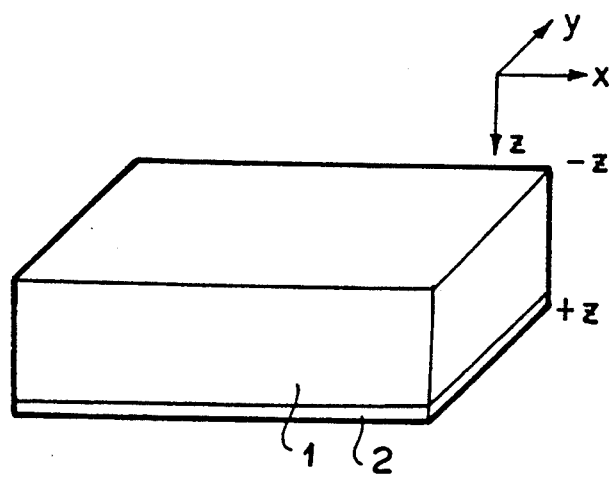
FIGS. 1A–1C are schematic representations showing the fabrication of an optical wavelength converter element according to a first embodiment of this invention.

With reference to the accompanying drawings, preferred embodiments of this invention will now be described. FIG. 1 shows the fabrication of an optical wavelength converter element according to a first embodiment of the present invention. In the drawing, reference numeral 1 designates a $LiNbO_3$ substrate (hereinafter referred to as an LN) made of a ferroelectric substance possessing a nonlinear optical effect. This substrate is subjected to a unipolarizing treatment, and is formed to a thickness of 0.2 mm. A "z" plate is used as this substrate 1. Its "z" surfaces are optically ground so that the largest nonlinear optical material constant $d_{33}$ can be effectively utilized. As shown in FIG. 1A, a Cr thin film 2 having a thickness of 30 nm is deposited as an earth electrode on the $+z$ surface of the substrate 1 by sputtering.

Figure 1B:
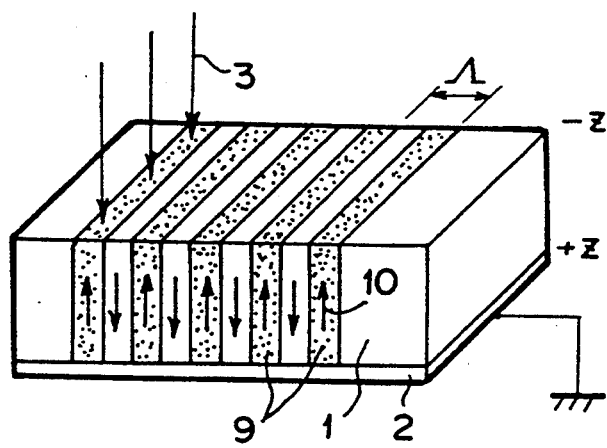

Also shown in FIG. 1B, localized areas on the $-z$ surface of the substrate 1 are exposed to electron beams 3 emanated from a known non-illustrated electron beam irradiation system. At this time, as one example, an electron beam accelerating voltage is set to 20–30 kV, and an irradiation current is set to 0.1–1 nA. The irradiation of this electron beam causes domain reversals 9 in a pattern alternately ,arranged at given period of $\Lambda$ to be formed throughout the substrate 1 from its top surface to its rear surface. An arrow 10 in FIG. 1B designates the direction of polarization. Here, with allowance for a wavelength dispersion of refractive index of the LN, the period $\Lambda$ of the domain reversals is set to 4.7 $\mu$m so that a first-order period can be obtained around 946 nm in a direction of X of the substrate 1.

This substrate 1 is then subjected to a heat treatment in air for three hours at a temperature of 540° C. which is below the Curie point of the LN (1130° C.). Thus, when the substrate is subjected to a heat treatment at a temperature less than its Curie point, the direction of polarization defined to a predetermined direction by the exposure to the electron beam 3 remains unchanged.

Figure 1C:
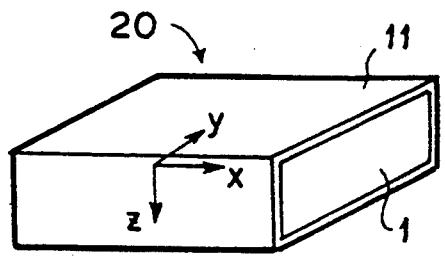

As shown in FIG. 1C, a thin film 11 of ITO (indium-tin-oxides) which is a transparent electrically conductive material is deposited on the surface of the substrate 5 extending along the direction of arrangement of the domain reversals 9, that is, the y and z surfaces of the substrate. The x and −x surfaces of the LN substrate are ground, so that they are formed into light transmitting surfaces 20a and 20b, respectively. As a result of this, as shown in FIG. 2, a bulk crystal type optical wavelength converter element 20 is obtained.

Figure 2:
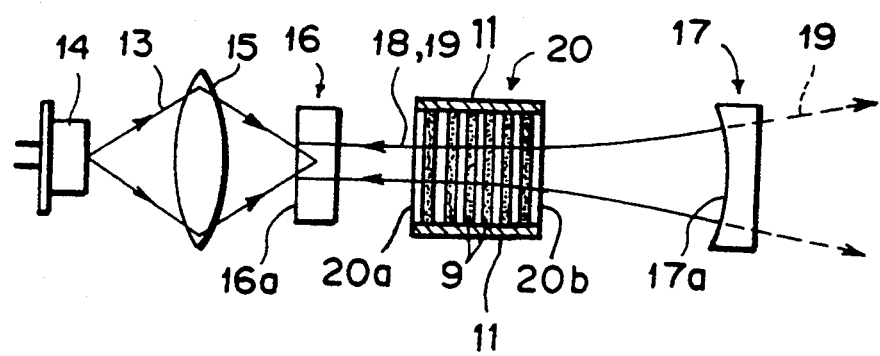
FIG. 2 is a side elevation view showing a solid-state laser equipped with the optical wavelength converter element according to the first embodiment of this invention.

The bulk crystal type optical wavelength converter element 20 having such periodic domain reversals is disposed within a cavity resonator of a laser-diode-pumped YAG laser shown in FIG. 2. This YAG laser is made up of: a laser diode 14 for emanating a laser beam 13 as a pumping beam at a wavelength of 809 nm; a YAG crystal 16 acting as a laser medium doped with Nd (neodymium) and disposed at a position onto which the laser beam 13 is focused; and a resonant mirror 17 disposed in front of the YAG crystal 16 (to the right in the drawing). The optical wavelength converter element 20 has a crystal length of 1 mm, and is interposed between the resonant mirror 17 and the YAG crystal 16.

The YAG crystal 16 is pumped by the laser beam 13 at a wavelength of 809 nm, and emanates a laser beam 18 at a wavelength of 946 nm. This solid-state laser beam 18 is oscillated between an end surface 16a covered with a given coating of the YAG crystal and a mirror surface 17a of the resonant mirror 17, and the beam enters the optical wavelength converter element 20, as a result of which the beam is converted to a second harmonic wave 19 at a half wavelength, that is, 473 nm. The solid-state laser beam 18 serving as the fundamental beam and the second harmonic wave 19 are phase-matched (i.e. quasi-phase-matched) with each other in the periodic domain reversals, and only this second harmonic wave 19 substantially exits from the resonant mirror 17.

In this embodiment, the diameter ($1/e^2$) of the laser beam 18 is 0.1 mm, and a thickness of 0.2 mm of the LN substrate 1 is closely approximate to this value. Hence, if the ITO thin film 11 affects this laser beam 18 and the second harmonic wave 19 in the form of reflection or scattering or the like, a considerable amount of propagation loss ought to arise. However, in this embodiment, when the laser diode 14 produced an output of 200 mW, the second harmonic wave 19 with an output as high as 10 mW was obtained. From the fact that such an extremely high wavelength conversion efficiency was achieved, it was proved that the laser beam 18 and the second harmonic wave 19, acting as a fundamental wave, were properly transmitted without experiencing a large amount of influence of the transparent ITO thin film 11 such as reflection and scattering or the like.

In the optical wavelength converter element 20 of this embodiment, no optical damage occurs when the second harmonic 19 produces an output of 10 mW. To the contrary, in an optical wavelength converter element produced similarly to the element 20 but dispensing with the ITO thin film 11, the occurrence of optical damage was admitted when the output of the second harmonic wave is 1 mW. It can be said that an optical damage threshold value is evidently improved.

A coating made of another transparent electrically conductive material may be used instead of the foregoing ITO thin film 11. For example, a transparent electrically conductive polymer or the like may be considered to such a material.

SECOND EMBODIMENT

Figure 3:
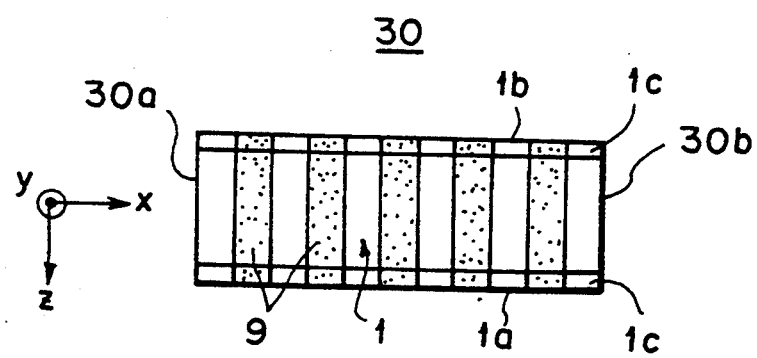
FIG. 3 is a schematic side cross-sectional view showing an optical wavelength converter element according to a second embodiment of this invention.

Referring to FIG. 3, an optical wavelength converter element according to a second embodiment of this invention will now be described. In FIG. 3, the same reference numerals are provided to designate features corresponding to those shown in FIGS. 1 and 2, and the explanation thereof will be omitted here for brevity (the same rule applies to successive embodiments). An optical wavelength converter element 30 of this second embodiment is a bulk crystal type element, and the domain reversals 9 periodically arranged are formed on the LN substrate 1. Low-resistance areas 1c are formed to the inside of the substrate from its surface extending in the direction of arrangement of the domain reversals 9, that is, "y" and "z" surfaces of the LN substrate 1. The electric resistance of this low-resistance area 1c is reduced below that of the other area in this substrate 1, and this area can be formed by immersing an LN substrate 1 in pyrophosphoric acid and then subjecting the substrate to proton exchange.

This proton exchange results in a proton-exchanged layer being formed on both x and −x surfaces of the LN substrate 1. However, the proton-exchanged layer is removed when the x and −x surfaces are ground to form optical transmitting surfaces 30a and 30b. It may be possible to produce a mask made of Ta on the x and −x surfaces of the LN substrate 1 prior to the proton exchange and remove that mask after the completion of the proton exchange.

The resistivity of the low-resistance area 1c is $10^7$ Ωcm, and becomes noticeably low when compared with a resistivity of $10^{13}$ Ωcm of the other area in the substrate 1. Such a low-resistance area 1c serves as a conductive part similar to the ITO thin film 11 in the optical wavelength converter element 20 of the first embodiment. This eliminates the deviation of electric charges of an LN crystal, whereby a optical damage threshold value can be improved.

This low-resistance area 1c will not affect a fundamental wave or a wavelength-converted wave by a significant amount of reflection and scattering or the like. Accordingly, a higher wavelength conversion efficiency is obtained by means of this optical wavelength converter element 30. For instance, when this optical wavelength converter element 30 is disposed within a cavity resonator of a laser-diode-pumped YAG laser shown in FIG. 2, and the laser diode 14 produces an output of 200 the second harmonic wave 19 having an output as large as 10 is obtained.

The above-mentioned low-resistance area 1c can be produced by depositing $SiO_2$ on the surface of the LN substrate 1 and subjecting the substrate to a heat treatment so that Li can be diffused outside other than the aforementioned proton exchange treatment. In addition, it may be possible to produce an ion-implanted layer by implanting ions into the substrate from the surface of the LN substrate 1 so that the layer can be a low-resistance area 1c.

THIRD EMBODIMENT

Figure 4:
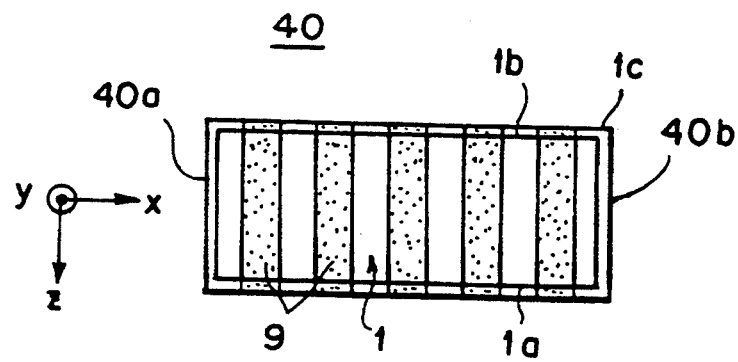
FIG. 4 is a schematic side cross-sectional view showing an optical wavelength converter element according to a third embodiment of this invention.

With reference to FIG. 4, a third embodiment of this invention will now be described. An optical wavelength converter element 40, according to this embodiment, is a bulk crystal type element. Similarly to the optical wavelength converter element 20 of the first embodiment, the domain reversals 9 periodically arranged are formed on the LN substrate 1. Low-resistance areas 1c are formed to the inside of the substrate 1 from its entire surface, that is, the x, y and z surfaces thereof. This low-resistance area 1c is formed in the same manner as in the second embodiment, whereby effects and advantages similar to those of the second embodiment are obtained.

In this case, it becomes unnecessary to eliminate the low-resistance area 1c formed to extend from optical transmitting surfaces 40a and 40b to the inside of the substrate by grinding, or eliminate operations for the removal of a mask after it has been formed on each of the surfaces 40a and 40b. However, it is more desirable not to produce a low-resistance area on an optical transmitting surface when the entrance and exit efficiencies of a fundamental wave or a wavelength-converted wave with respect to an optical wavelength converter element are improved.

But, when the surface of a ferroelectric substance is covered with a coating made of a transparent electrically conductive material as shown in the first embodiment, the entire surface of the ferroelectric substance may be covered with a coating in the same manner as in the previous embodiment.

FOURTH EMBODIMENT

Figure 5:
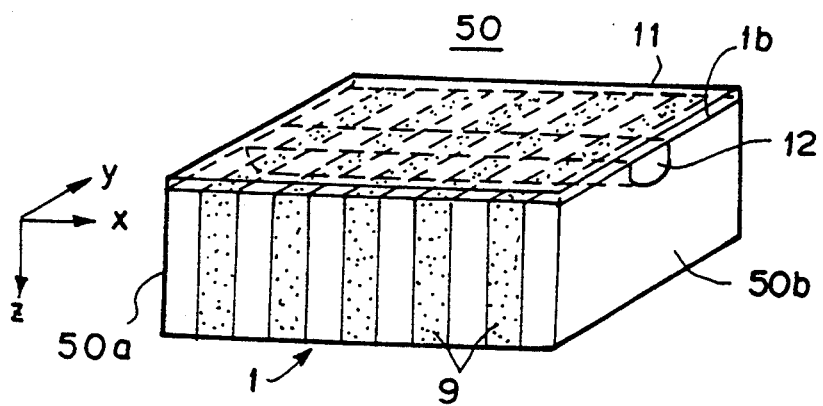
FIG. 5 is a schematic perspective view showing an optical wavelength converter element according to a fourth embodiment of this invention.

With reference to FIG. 5, a fourth embodiment will now be described. An optical wavelength converter element 50, according to this fourth embodiment, is an optical waveguide type element. In the same manner as the fabrication of the optical wavelength converter elements according to the first to third embodiments, after the domain reversals 9 periodically arranged are formed on the LN substrate 1, a channel waveguide 12 is formed in such a manner that light travels in the direction of arrangement of the domain reversals, i.e. in a direction of the x axis. This waveguide 12 is fabricated in the way described below. After a Ta thin film having a thickness of 50 nm has been formed by sputtering a metal Ta onto the −z surface of the substrate 1, a mask pattern having a width of 4 μm is defined by photolithography and dry etching. This substrate 1 is then subjected to a proton exchange treatment in pyrophosphoric acid for 15 minutes at a temperature of 230 centigrade. The Ta mask is removed by an etchant which is a mixture of NaOH and $H_2O_2$, and then annealed for 5 minutes at a temperature of 300° C., whereby the channel waveguide 12 is produced.

Thereafter, an ITO thin film 11 made of an electrically conductive transparent material is deposited on the surface of the substrate extending in the direction of arrangement of the domain reversals 9 and being provided with the channel waveguide 12, i.e. the −z surface of the substrate. The x and −x surfaces of the LN substrate 1 are ground, so that they are formed into optical transmitting surfaces 50a and 50b. Eventually, the channel waveguide type optical wavelength converter element 50 as shown in FIG. 5 is obtained.

When a laser beam at a wavelength of Λ is incident on the entry end 50a as a fundamental wave, phase matching in a waveguide-waveguide mode is effected, and hence it is possible to cause a second harmonic wave at a wavelength of Λ/2 to exit from the output end 50b efficiently.

Figure 6:
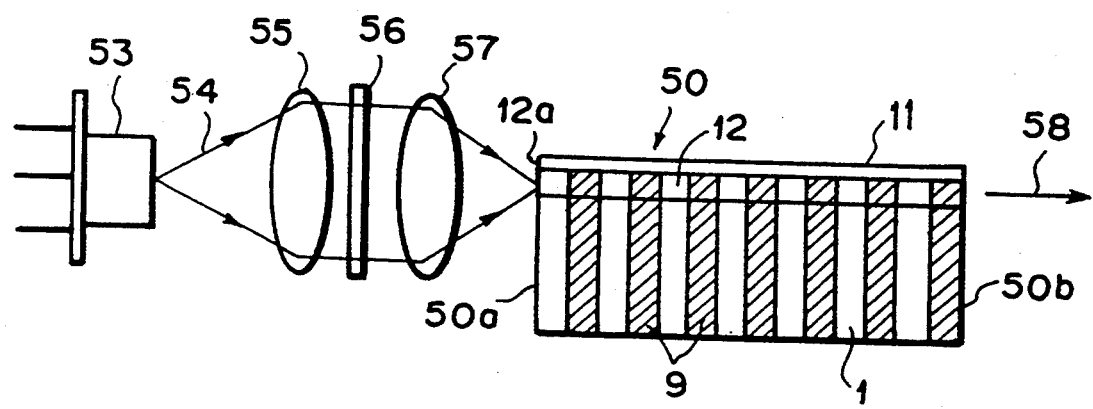
FIG. 6 is a schematic side elevation view showing the optical wavelength converter element according to the fourth embodiment of this invention when it is in use.

As one example, with reference to FIG. 6, an explanation will be given of a case in which a laser diode is used as a fundamental wave light source. A laser beam 54 at a wavelength of 880 nm emanated as a fundamental wave from a laser diode 53 is collimated by means of a collimating lens 55, and the direction of polarization of the wave is brought into alignment with a direction of the z axis of the channel waveguide 12 by a Λ/2 plate 56. This wave is then collected by a condensing lens 57, and focused onto the end surface 12a of the channel waveguide 12. Thus, the fundamental wave 54 enters and propagates through the channel waveguide 12.

The fundamental wave 54 traveling through the channel in a waveguide mode is phase-matched in the periodic domain reversals within the waveguide 12, as a result of which the wavelength of the fundamental wave is converted to a second harmonic wave 58. This second harmonic wave 58 also propagates through the channel waveguide 12 in the waveguide mode, and efficiently exits from the output end 50b. The direction of polarization of the second harmonic wave 58 appearing from the output end is also in line with the direction of the z axis. Hence it can be said that the largest nonlinear optical material constant $d_{33}$ of the LN is utilized. When the output of the laser diode 53 is 100 mW, and an interactive length between the fundamental wave of the element 50 and the laser is 9 mm, the output of a resultant second harmonic wave is 5 mW.

In this optical wavelength converter element 50 of the fourth embodiment, the electrically conductive ITO thin film 11 is deposited on the surface of the substrate that extends in the direction of arrangement of the domain reversals 9. Hence, the deviation of electric charges of the LN crystal can be eliminated by means of this ITO thin film 11, and it is also possible to cause an optical damage threshold value to be improved.

Since the ITO thin film 11 is transparent, both the fundamental wave 54, traveling in the channel waveguide 12 in a waveguide mode, and the second harmonic wave 58, can travel in a superior manner without being affected by significant amounts of reflection and scattering or the like caused because of this ITO thin film 11.

FIFTH EMBODIMENT

Figure 7:
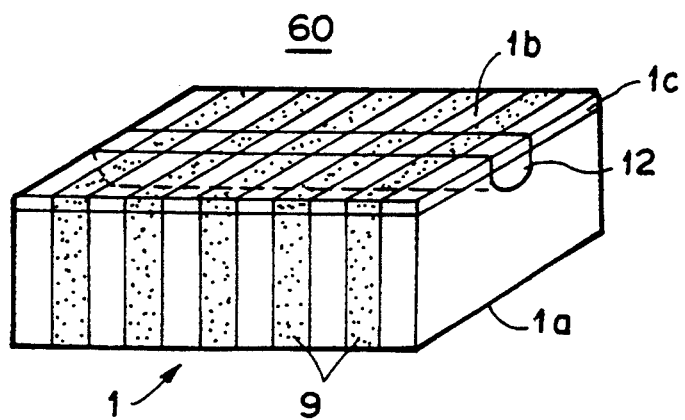
FIG. 7 is a schematic perspective view showing an optical wavelength converter element according to a fifth embodiment of this invention.

With reference to FIG. 7, a fifth embodiment will now be described. An optical wavelength converter element 60 according to this fifth embodiment is an optical waveguide type element. When compared with the converter element 50 of the fourth embodiment, the element 60 is different from the element 50 in that a low-resistance area 1c is formed to extend from the −z surface 1b of the LN substrate 1 to the inside of the substrate instead of the ITO thin film 11. This low-resistance area 1c can be formed by proton exchange, outer diffusion, inner diffusion and ion implantation, or the like, as described before. Even in this embodiment, the presence of such a low-resistance area 1c results in effects similar to those of the fourth embodiment.

SIXTH EMBODIMENT

Figure 8:
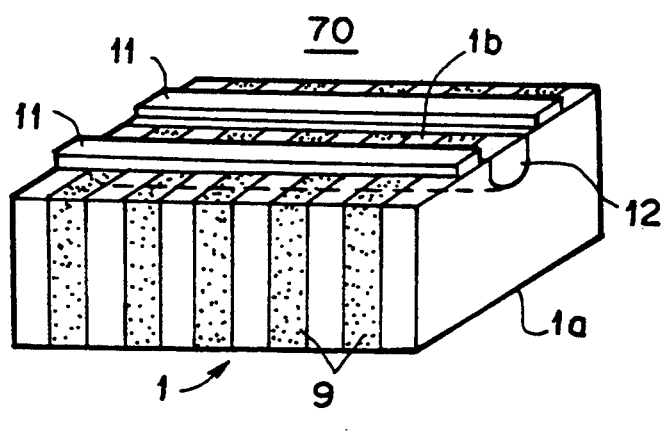
FIG. 8 is a schematic perspective view showing an optical wavelength converter element according to a sixth embodiment of this invention.

With reference to FIG. 8, a sixth embodiment of this invention will now be described. An optical wavelength converter element 70, according to this sixth embodiment, is an optical waveguide type element. When compared with the optical wavelength converter element 50 of the fourth embodiment, this element 70 is different from the element 50 in that the ITO thin film 11 is formed not over the entire −z surface of the LN substrate 1 but only on the area of the −z surface 1b adjacent to the channel waveguide 12. With such an arrangement, the deviation of electric charges at the area of the LN crystal through which a fundamental wave and a wavelength-converted wave travel is eliminated, and hence an optical damage threshold value can be improved.

When a low-resistance area 1c is formed like the fifth embodiment, the low-resistance area 1c need be formed only at the area adjacent to the channel waveguide 12.

Moreover, in this embodiment, the fabrication method for periodic domain reversals is not limited to the foregoing method, that is, a method for exposing a ferroelectric substance to an electron beam. Any other methods, for instance, a method for applying an electric field to proton-exchanged areas on a ferroelectric substance may be employed.

When a method for exposing a ferroelectric substance to an electron beam is employed, the inversion of polarization may occur from the area that is situated inside the crystal a fairly small distance below the exposed side surface of the crystal. In such a case, the area without being subjected to polarization inversion that extends between the surface and the inside of the crystal is removed by grinding. It is desirable that this newly ground surface of the crystal after the grinding should be covered with a coating such as an ITO thin film 11 or the like, or a low-resistance area should be formed to extend from a new crystal surface to the inside of the crystal.

As one example, when a bulk crystal type optical wavelength converter element is formed in the same manner as in the first embodiment, a surface of the LN substrate 1 to be exposed to an electron beam is ground by several micrometers, and that ground surface is coated with the ITO thin film 11. The optical wavelength converter element thus obtained is disposed within a cavity resonator of a laser-diode-pumped YAG laser as shown in FIG. 2. When the laser diode 14 produces an output of 200 mW, a second harmonic wave 19 having an output of 15 mW which is further higher than the first embodiment is obtained. Thus, it is evident that a wavelength conversion efficiency is improved by grinding the surface of the substrate that is exposed to an electron beam.

Moreover, this invention is applicable not only to when an LN is used as a ferroelectric substance possessing a nonlinear optical effect but also, in the same manner, to any cases in which other ferroelectric substances are used.

It will be understood that the above description of the present invention is susceptible to various modifications, changes, and adaptations and that the same are intended to be comprehended within the meaning and range of equivalents of the appended claims.

What is claimed is:

1. An optical wavelength converter element comprising:
    a ferroelectric crystal possessing a nonlinear optical effect and having domain reversals periodically defined therein such that the wavelength of a fundamental wave entered in the direction of arrangement of said domain reversals in converted; and
    a transparent outer layer made from a transparent electrically conductive material, and formed at least in the vicinity of an optical path for said fundamental wave on a surface of said crystal that extends in the direction of the arrangement of said domain reversals of said ferroelectric crystal, for reducing electrical deviations within said crystal and minimizing optical interference with said fundamental and converted waves.

2. An optical wavelength converter element in which domain reversals are periodically defined on a ferroelectric crystal possessing a nonlinear optical effect, and the wavelength of a fundamental wave entered in the direction of arrangement of said domain reversals is converted, the improvement comprising:
    a low-resistance area (that is, an area whose electrical resistance is reduced lower than other areas) formed from at least the vicinity of an optical path for said fundamental wave toward the inside of said crystal on a surface of said crystal that extends in the direction of the arrangement of said domain reversals made of said ferroelectric crystal.

3. A method for fabricating an optical wavelength converter element, comprising the steps of:
    forming domain reversals periodically defined on a ferroelectric crystal which possesses a nonlinear optical effect; and
    creating an outer layer by covering at least the vicinity of an optical path for a fundamental wave on a surface that extends in the direction of arrangement of said domain reversals made of said ferroelectric crystal with a coating made of a transparent electrically conductive material, to reduce electrical deviations and optical interference within said crystal.

4. A method for fabricating an optical wavelength converter element as defined in claim 3, said method comprising the steps of:
    forming domain reversals periodically arranged on a ferroelectric crystal possessing a nonlinear optical effect by exposing said crystal to an electron beam; and
    grinding a surface of said ferroelectric crystal exposed to the electron beam; and
    covering said crystal with said coating made of said transparent electrically conductive material.

5. A method for fabricating an optical wavelength converter element, comprising the steps of:
    forming domain reversals periodically defined on a ferroelectric crystal possessing a nonlinear optical effect; and
    subjecting said crystal to a treatment causing a drop in electrical resistance of, at least, a region ranging from the vicinity of an optical path for a fundamental wave to the inside of said crystal in a surface of said crystal that extends in the direction of arrangement of said domain reversals made of said ferroelectric crystal.

6. A method for fabricating an optical wavelength converter element as defined in claim 5, said method comprising the steps of:
    forming domain reversals periodically arranged on a ferroelectric crystal possessing a nonlinear optical effect by exposing said crystal to an electron beam; and
    grinding a surface of said ferroelectric crystal exposed to the electron beam; and
    subjecting said crystal to a treatment causing a drop in electrical resistance of, at least, a region ranging from the vicinity of an optical path for a fundamental wave to the inside of said crystal in a surface of said crystal that extends in the direction of arrangement of said domain reversals made of said ferroelectric crystal.

* * * * *